United States Patent
Naka et al.

(10) Patent No.: US 8,411,900 B2
(45) Date of Patent: Apr. 2, 2013

(54) DEVICE FOR DETECTING/JUDGING ROAD BOUNDARY

(75) Inventors: Takuya Naka, Hitachinaka (JP); Tatsuhiko Monji, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 315 days.

(21) Appl. No.: 12/920,405

(22) PCT Filed: Jun. 10, 2009

(86) PCT No.: PCT/JP2009/060975
§ 371 (c)(1),
(2), (4) Date: Dec. 1, 2010

(87) PCT Pub. No.: WO2010/032523
PCT Pub. Date: Mar. 25, 2010

(65) Prior Publication Data
US 2011/0063097 A1      Mar. 17, 2011

(30) Foreign Application Priority Data
Sep. 17, 2008  (JP) ................ 2008-237878

(51) Int. Cl.
*G06K 9/00* (2006.01)
(52) U.S. Cl. ........ 382/103; 340/436; 340/937; 348/148; 701/300
(58) Field of Classification Search .......... 340/435–437, 340/425.5, 937; 348/148, E07.085; 382/103; 701/300, 301
See application file for complete search history.

(56) References Cited

U.S. PATENT DOCUMENTS

| 5,410,346 A | * | 4/1995 | Saneyoshi et al. | 701/301 |
| 6,169,572 B1 | * | 1/2001 | Sogawa | 348/113 |

(Continued)

FOREIGN PATENT DOCUMENTS

| JP | 6-266828 A | 9/1994 |
| JP | 11-213138 A | 8/1999 |
| JP | 2000-331148 A | 11/2000 |
| JP | 2003-204546 A | 7/2003 |
| JP | 2003-233899 A | 8/2003 |
| JP | 2003-281552 A | 10/2003 |
| JP | 2006-53757 A | 2/2006 |

OTHER PUBLICATIONS

International Search Report including English translation dated Jul. 14, 2009 (Seven (7) pages).

*Primary Examiner* — Eric M Blount
(74) *Attorney, Agent, or Firm* — Crowell & Moring LLP

(57) ABSTRACT

There is provided a road boundary detection/judgment device resistant to environmental change and capable of detecting even a road boundary demarcated by a three-dimensional object in the distance. The device is provided with: an image acquisition section having two or more cameras for image-capturing the road area; a distance data acquisition section acquiring three-dimensional distance information about an image-capture area on the basis of an image obtained by the image acquisition section; a road boundary detection section detecting the height of a three-dimensional object existing in the road area on the basis of the three-dimensional distance information obtained by the distance data acquisition section to detect a road boundary; and a same boundary judgment section transforming the image, for a first road area where the height of a three-dimensional object corresponding to a road boundary could be detected and a second road area where the height of a three-dimensional object corresponding to a road boundary could not be detected, and judging whether the three-dimensional object corresponding to the first road area and the three-dimensional object corresponding to the second road area are the same. If it is judged that the three-dimensional objects corresponding to the first and second road area boundaries are the same, the second road area is reset as the first road area.

6 Claims, 18 Drawing Sheets

U.S. PATENT DOCUMENTS

| | | |
|---|---|---|
| 6,370,261 B1 | 4/2002 | Hanawa |
| 7,046,822 B1 * | 5/2006 | Knoeppel et al. ............. 382/103 |
| 7,421,148 B2 * | 9/2008 | Takeda et al. ................ 382/276 |
| 7,667,581 B2 * | 2/2010 | Fujimoto ...................... 340/436 |
| 7,747,039 B2 * | 6/2010 | Fujimoto ...................... 340/436 |
| 2001/0019356 A1 * | 9/2001 | Takeda et al. ................ 348/148 |
| 2003/0099377 A1 | 5/2003 | Hanawa |
| 2008/0253606 A1 | 10/2008 | Fujimaki et al. |
| 2009/0028384 A1 * | 1/2009 | Bovyrin et al. ............... 382/103 |
| 2009/0052742 A1 * | 2/2009 | Okamoto ...................... 382/104 |
| 2009/0169052 A1 * | 7/2009 | Seki et al. ..................... 382/103 |

\* cited by examiner

FIG. 9

| Strip number | Left side | Right side |
|---|---|---|
| W1 | First road area | Second road area |
| W2 | First road area | Second road area |
| W3 | First road area | First road area |
| W4 | First road area | First road area |
| W5 | Second road area | First road area |
| W6 | Second road area | Second road area |
| . | . | . |
| . | . | . |
| . | . | . |
| Wn | Second road area | Second road area |

////  Shaded parts indicate detected three-dimensional
       objects corresonding to road boundaries

DEVICE FOR DETECTING/JUDGING ROAD BOUNDARY

TECHNICAL FIELD

The present invention relates to a device for detecting a road boundary demarcated by a three-dimensional object, by multiple image capture devices mounted on a vehicle, to judge a driving area of the vehicle, and in particular to a device for detecting/judging road boundary capable of coping even with a case where detection of a three-dimensional object corresponding to a road boundary is difficult due to occlusion or unclearness of a taken image.

BACKGROUND ART

There has been conventionally promoted technical development of an ASV (Advanced Safety Vehicle) which gives warnings or operational support to a driver to secure safe driving of the vehicle. The ASV is especially required to detect a road boundary in order to prevent the vehicle from running off a road. Therefore, there has been often used a method of detecting traffic signs defining a roadway, such as traffic lanes and raised markers on the road surface, using a camera mounted on a vehicle.

However, though existence of the traffic signs can be expected in the case of an expressway or a properly improved road, there is often not a traffic sign outside a lane edge in the case of a narrow road or a road under improvement. Furthermore, in the case of a road with a short curve diameter, it is difficult to judge a road boundary because the lanes at a curved part of the road are difficult to be caught by a camera. Therefore, it is necessary to judge a road boundary not only from traffic signs such as lanes and raised markers but also from three-dimensional objects such as walkway/roadway separation blocks, a walkway, a hedge, a guardrail, a side wall and a pole.

As a method for detecting a road boundary demarcated by a three-dimensional object with a camera, there is a method using two or more cameras. For example, in Patent Literature 1, there is proposed a method in which a road boundary is detected by calculating the height of a three-dimensional object in an image capture area from the road surface on the basis of stereo images obtained by two cameras to detect a continuous three-dimensional object such as a guardrail and a side wall.

In Patent Literature 2, there is disclosed a road shoulder detection device and method using two cameras and adopting a plane projection stereo method. In the plane projection stereo method, all objects in an image obtained by one camera are assumed to exist on a road plane, and this image is transformed to an image viewed from the other camera. In the transformed image, a part corresponding to the road plane is not transformed, and only parts corresponding to three-dimensional objects are transformed. By comparing this transformed image and an image obtained by the other camera, the three-dimensional objects on the road plane can be detected.

CITATION LIST

Patent Literature

Patent Literature 1: JP Patent Application Publication No. 11-213138 A (1999)
Patent Literature 2: JP Patent Application Publication No. 2003-233899 A

SUMMARY OF INVENTION

Technical Problem

In the method described in Patent Literature 1 above, it is necessary to perform corresponding point search between stereo images to calculate the height of a three-dimensional object from the road surface. However, when the edges or shading pattern of three-dimensional objects in an image become unclear because of environmental change such as reduction of brightness, the accuracy of the corresponding point search generally deteriorates. Furthermore, in the case where the height of a three-dimensional object is low or a three-dimensional object exists in the distance, the three-dimensional object shown in an image is small, and it is difficult to determine the height of the three-dimensional object from the road surface. The technique in Patent Literature 1 has a problem that it is difficult to obtain a road boundary demarcated by a three-dimensional object in the case of such a road that the height of a three-dimensional object cannot be obtained.

The method described in Patent Literature 2 has a problem that, since it is necessary to know a road surface on which a vehicle runs in advance, it is difficult to apply the method to a road with much slope change or detect a road boundary demarcated by a three-dimensional object in the distance.

To solve the problems of the prior techniques as described above, the object of the present invention is to provide a device for detecting/judging road boundary resistant to environmental change and capable of detecting even a road boundary demarcated by a three-dimensional object in the distance.

Solution to Problem

To solve the above problems, the road boundary detection/judgment device of the present invention is an in-vehicle device detecting and judging a three-dimensional object indicating a boundary of a road on which a vehicle runs, the device comprising: an image acquisition section having two or more cameras for image-capturing the road area; a distance data acquisition section acquiring three-dimensional distance information about an image-capture area on the basis of an image obtained by the image acquisition section; a road boundary detection section detecting the height of a three-dimensional object existing in the road area on the basis of the three-dimensional distance information obtained by the distance data acquisition section to detect a road boundary; and a same boundary judgment section transforming the image, for a first road area where the height of a three-dimensional object corresponding to a road boundary could be detected by the road boundary detection section and a second road area where the height of a three-dimensional object corresponding to a road boundary could not be detected by the road boundary detection section, and judging whether the three-dimensional object corresponding to the first road area and the three-dimensional object corresponding to the second road area are the same; wherein, if the same boundary judgment section judges that the three-dimensional objects corresponding to the first and second road area boundaries are the same, the second road area is reset as the first road area.

Advantageous Effects of Invention

According to the present invention, it is possible to, when the edges or shading pattern of a three-dimensional object in an image becomes unclear because the brightness in the environment changes or because the three-dimensional object exists in the distance, or when a part of three-dimensional distance data of a three-dimensional object cannot be detected because of occurrence of occlusion, detect and judge a road boundary demarcated by the three-dimensional object by searching for the three-dimensional object in the image on the basis of image information about a three-dimensional object which has already been determined.

BRIEF DESCRIPTION OF DRAWINGS

FIG. 9 shows strip numbers and an example of a state of detection of the three-dimensional objects corresponding to the right and left road boundaries.

DESCRIPTION OF EMBODIMENTS

An embodiment of a road boundary detection device will be described below with reference to drawings.

First Embodiment

Figure 1:
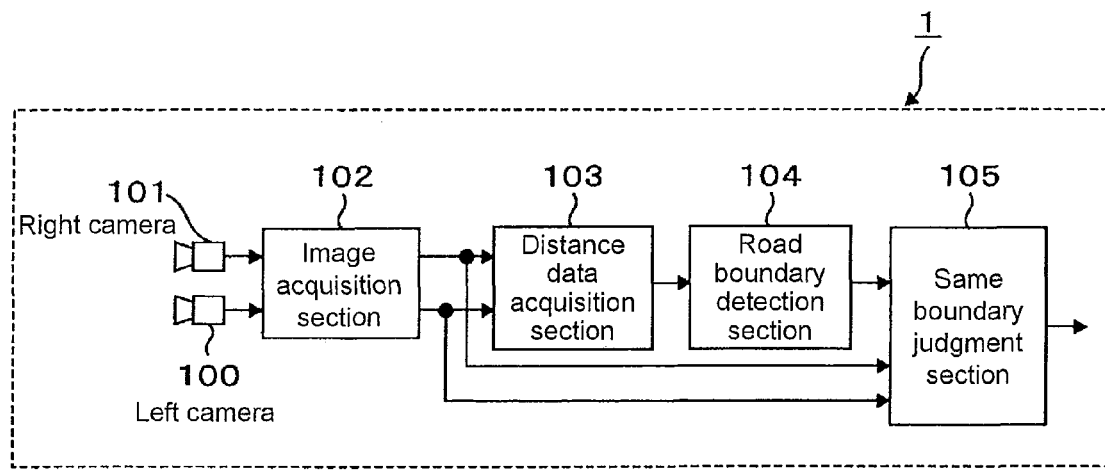
FIG. 1 is a block diagram of a road boundary detection/judgment device of a first embodiment.

FIG. 1 is a block diagram showing the configuration of a road boundary detection/judgment device of a first embodiment. A road boundary detection/judgment device 1 is provided with a left camera 100, a right camera 101, and an image acquisition section 102 for storing images taken by the left camera 100 and the right camera 101 at the same timing. The road boundary detection/judgment device 1 is further provided with a distance data acquisition section 103 for acquiring three-dimensional distance data of the image capture areas of the right and left cameras, from the two images stored in the image acquisition section 102, a road boundary detection section 104 for detecting a road boundary on the basis of the three-dimensional distance data obtained by the distance data acquisition section 103, and a same boundary judgment section 105 for outputting the position and height of a road boundary from an output of the road boundary detection section 104 and an output of the image acquisition section 102.

Figure 2:
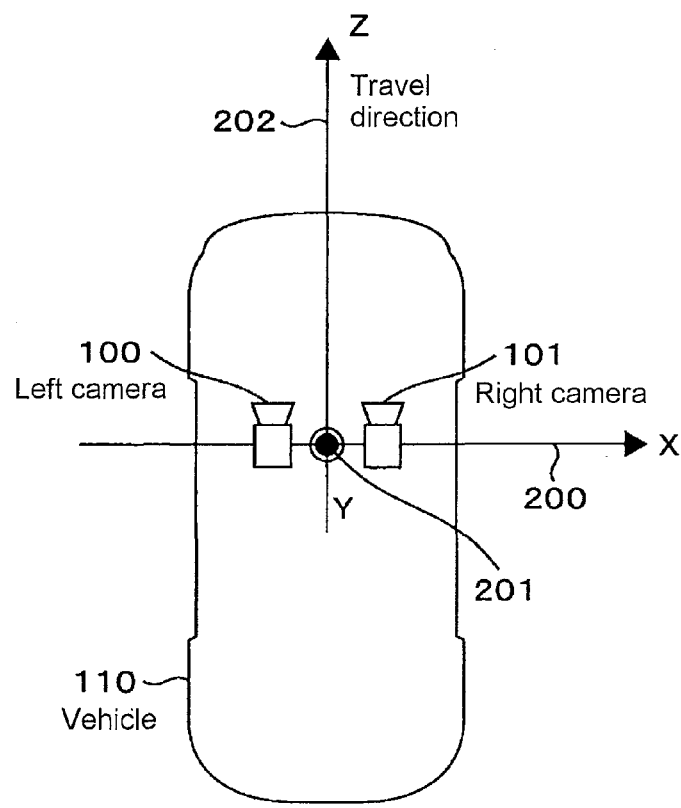
FIG. 2 shows arrangement of right and left cameras mounted on a vehicle and a coordinate system.

FIG. 2 shows a vehicle 110 on which the left camera 100 and the right camera 101 are mounted. The left camera 100 and the right camera 101 are installed on the left and right sides of the travel direction of the vehicle, respectively. Though the cameras are generally installed on the internal side of the front window, they may be installed inside the left and right head light covers. They may be installed in the front grille. The distance between the optical axes of the left and right cameras 100 and 101 and the height thereof from the road surface are set appropriately according to the type of the vehicle 110. The left and right cameras 100 and 101 are installed so that the viewing angles thereof are overlapped by a predetermined amount.

The image acquisition section 102 outputs an image capture timing signal to the left and right cameras 100 and 101 so that images are taken at the same time, acquires image data of the left and right cameras 100 and 101 after a predetermined time of exposure by an electronic shutter or a mechanical shutter, and stores the image data into a memory.

The distance data acquisition section 103 calculates three-dimensional distance data of areas image-captured by the left and right cameras 100 and 101. The three-dimensional distance data is calculated by associating points existing in the three-dimensional space, between the right and left images on the basis of the principle of triangulation. As a method for association between points, SAD (Sum of Absolute Difference) for determining the sum of luminance differences, SSD (Sum of Squared Difference) for determining the sum of squares of luminance differences, a normalized correlation matching method or a phase-only correlation method is often used. By performing association with sub-pixel accuracy, the accuracy of the three-dimensional distance data can be improved. In the coordinate system of the three-dimensional distance data, the travel direction, the width direction of the vehicle 110 and the height direction thereof are indicated by indicated by a Z axis 202, an X axis 200 and a Y axis 201, respectively, and the origin is set at the middle of the installation positions of the right and left cameras, as shown in FIG. 2. (Hereinafter, this coordinate system will be referred to as a "world coordinate system".)

Figure 3:
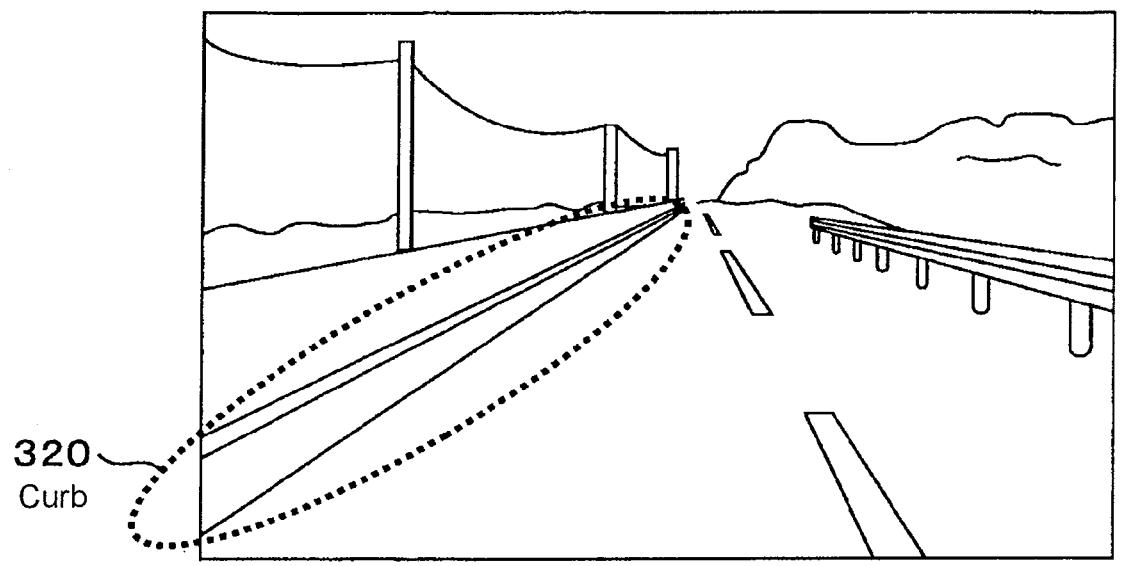
FIG. 3 shows an example of an image obtained by image-capturing the travel direction with the right camera shown in FIG. 2.

The road boundary detection section 104 is a section for judging whether a three-dimensional object corresponding to a road boundary exists, on the basis of the three-dimensional distance data calculated by the distance data acquisition section 103. FIG. 3 shows an image taken by the right camera 101. An example of detection of a curb 320 shown in this image will be described below. FIGS. 15 to 18 are flowcharts showing the process flow of the first embodiment.

Figure 4:
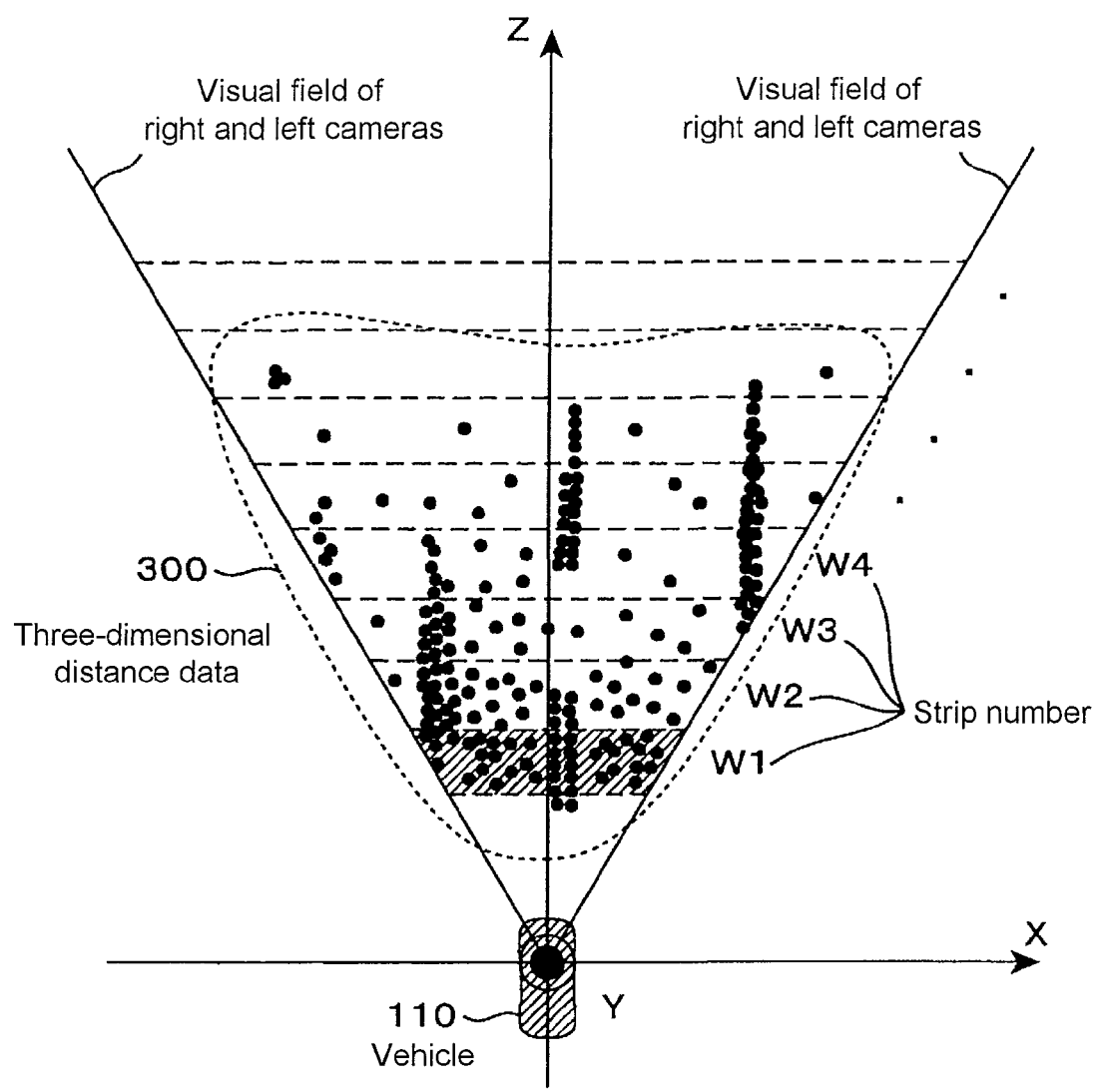
FIG. 4 shows an image obtained by projecting three-dimensional distance data of images taken by right and left cameras mounted on the vehicle onto an XZ plane, and strips which are areas separated at predetermined intervals in a Z direction.

FIG. 4 is a bird's-eye view when the XZ plane is viewed from directly above. Black points indicate positions of the three-dimensional distance data calculated by the distance data acquisition section (see S02 in FIG. 15). The three-dimensional distance data are distributed within the visual field range of the left and right cameras 100 and 101, and the number of data is generally larger on the near side of the vehicle than on the far side. In order to detect three-dimensional objects corresponding to road boundaries from this three-dimensional distance data distribution, areas separated at predetermined intervals in the Z axis direction (hereinafter, the areas will be referred to as "strips") are provided as shown in FIG. 4 (see S03 in FIG. 15). Then, a road boundary detection process is performed for each strip. The length of the width of the strips may be appropriately set. However, it is desirable to set the length so as to correspond to the width of the vehicle 110. The length (in the X axis direction) may be changed according to the speed of the vehicle 110.

Figure 5:
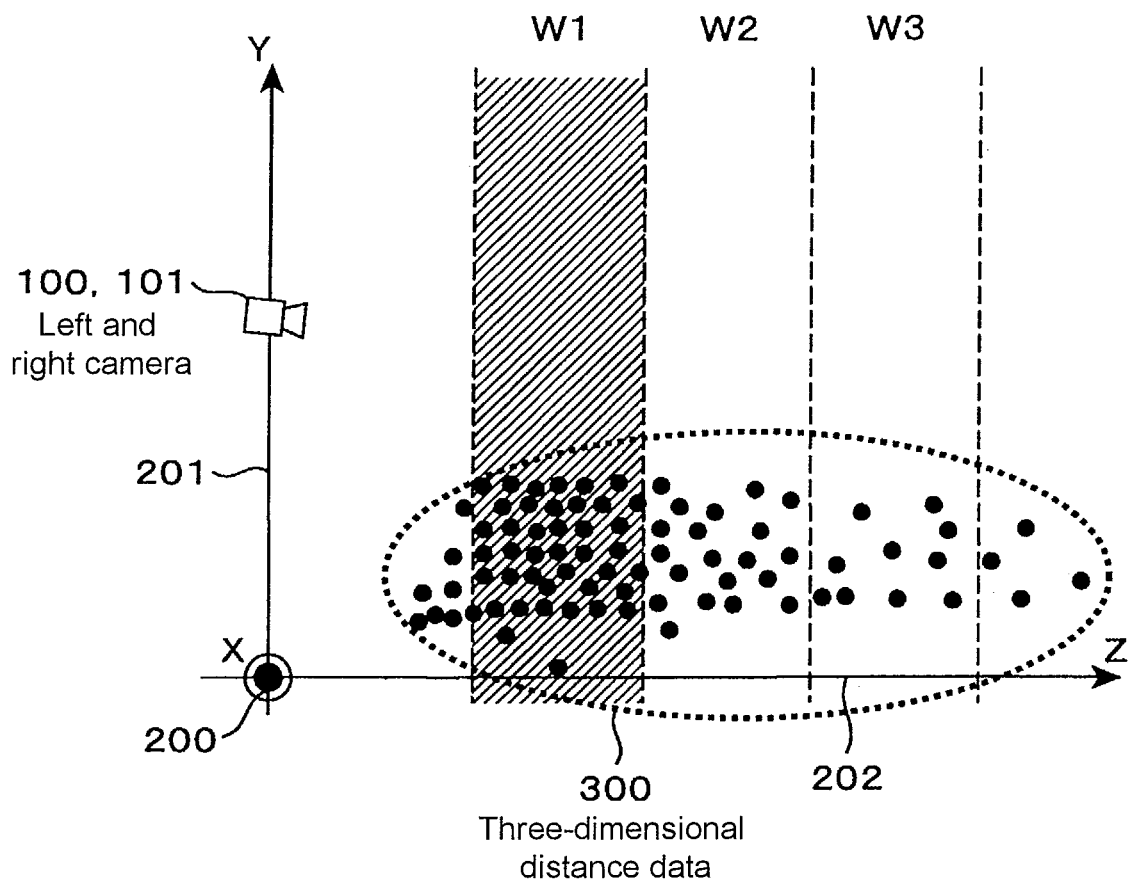
FIG. 5 shows an image obtained by projecting the three-dimensional distance data of the images taken by the right and left cameras mounted on the vehicle onto an YZ plane, and the strips which are areas separated in the Z direction.
Figure 6:
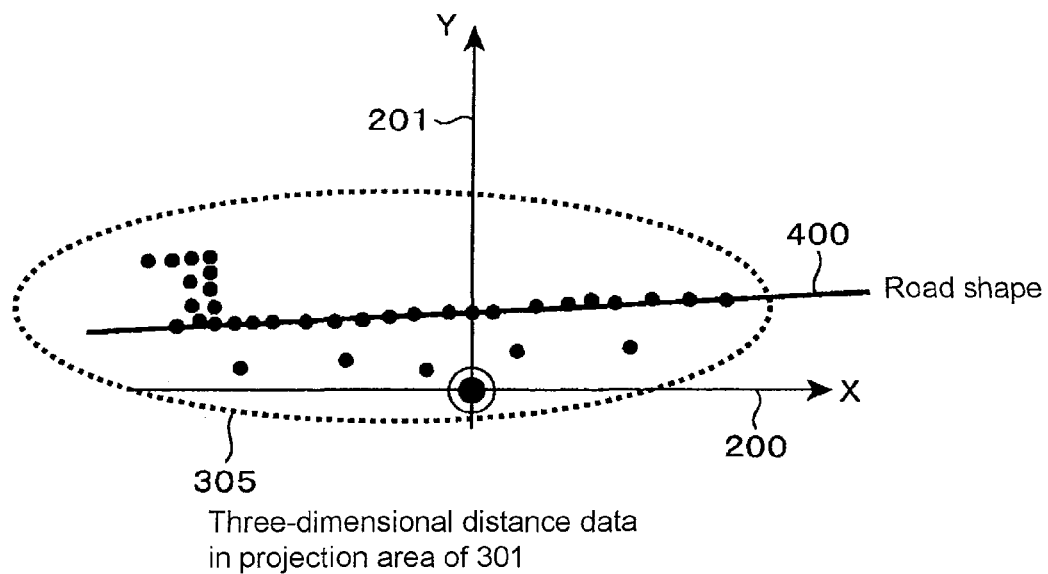
FIG. 6 shows distribution of the three-dimensional distance data included in the strips and a detected road shape.

Next, a method for determining a road shape from the three-dimensional distance data included in the strips (see S04 in FIG. 15) will be described. FIG. 5 is a diagram showing the three-dimensional distance data projected onto a YZ plane. The horizontal axis indicates the Z axis 202 in the depth direction, and the vertical axis indicates the Y axis 201 in the height direction. Black points indicate the positions of the three-dimensional distance data, similarly to FIG. 4. When three-dimensional included in a strip with a strip number W1 is projected onto an XY plane formed by the X and Y axes, data distribution shown in FIG. 6 is obtained. From this distribution, a road shape is estimated in accordance with a road model indicated by the following formula:

$$Y = a \cdot X + b \quad \text{(Formula 1)}$$

Formula 1 is a road model expressed by a simple equation, where a and b are parameters. There are various methods for calculating the parameters. In the case of using Hough transform for data distribution on the XY plane, such a and b that the number of votes peaks in a predetermined area in the Hough space can be selected. Furthermore, it is recommended to use a method in which a and b are re-searched for by the M-estimation method, with a value calculated by the Hough transform as the initial value, to reduce the influence of outliers. It is also possible to use not a simple equation but a multi-dimensional equation as a road model.

Figure 7:
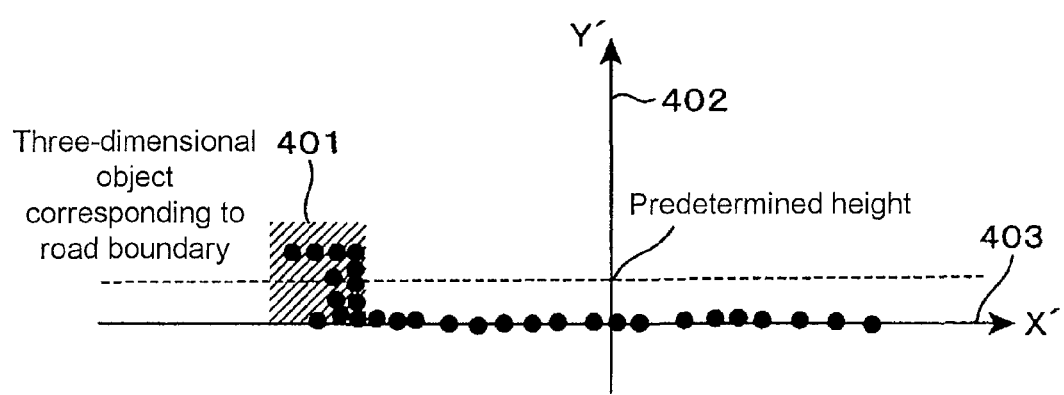
FIG. 7 shows distribution of the three-dimensional distance data included in the strips and a detected three-dimensional object corresponding to a road boundary.

The result of applying the road model of Formula 1 to the data distribution described above is a straight line 400 shown in FIG. 6. For this calculated road model, it is searched for whether a three-dimensional shape with a predetermined height or higher exists on each of the right and left in the travel direction. As a search method, it is conceivable, for example, to search for whether a group of data with a predetermined height or higher exits, with the straight line 400 as the X axis, and a straight line 402 crossing with the straight line 400 at right angles newly set as a Y' axis, as shown in FIG. 7. As the result of the search, existence of a three-dimensional object corresponding to a left-side road boundary is confirmed at a shaded area 401 shown in FIG. 7.

Figure 16:
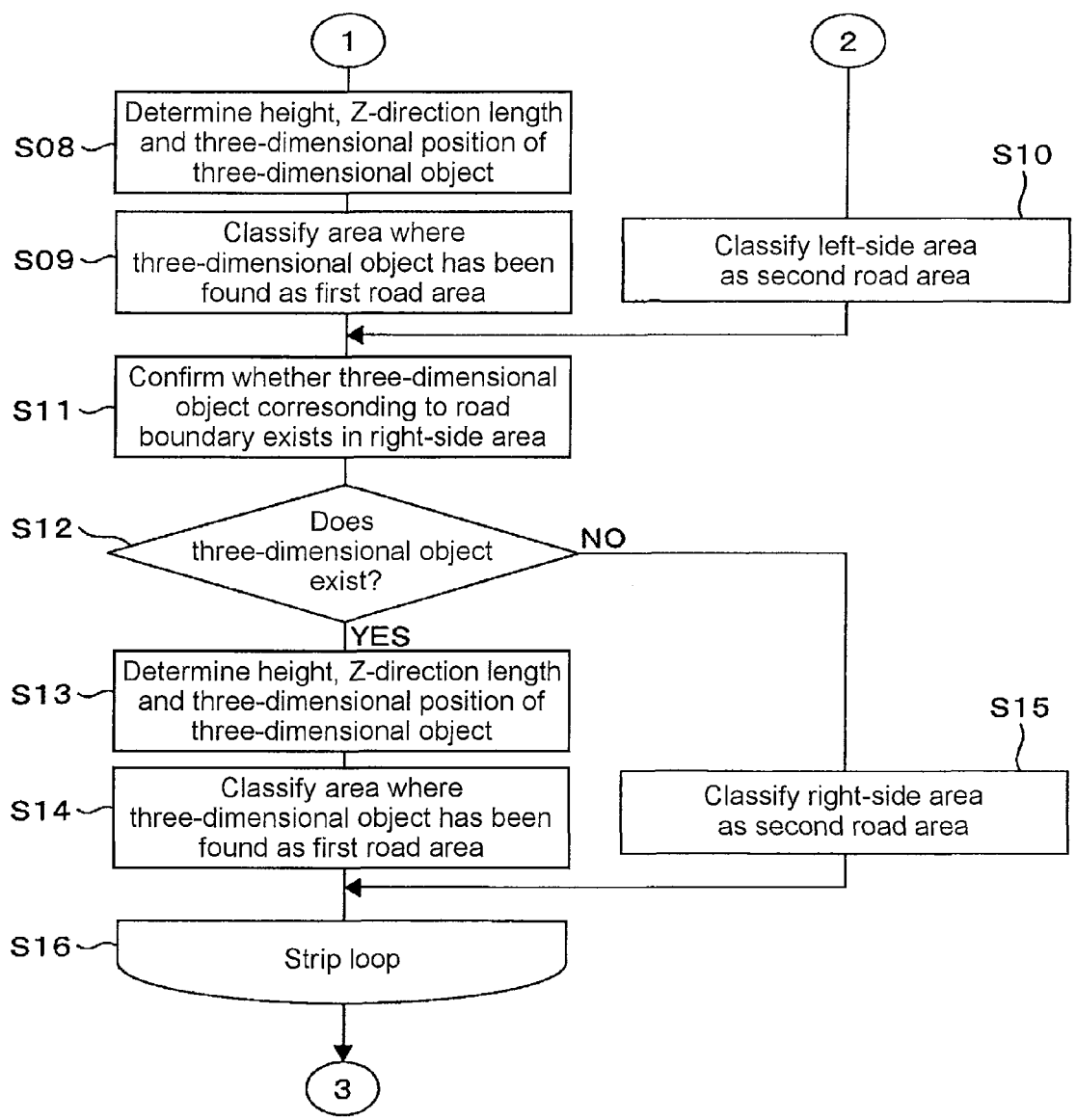
FIG. 16 shows a part of the operation flowchart of the first embodiment.

By repeatedly executing the above process for each strip, the heights and positions of three-dimensional objects corresponding to right and left road boundaries are detected (see S08 in FIG. 16). Then, according to the state of detection of the three-dimensional objects corresponding to the right and left road boundaries for each strip, each area separated on the right or left is classified as a first road area if a three-dimensional object can be detected (see S14 in FIG. 16) or a second road area if a three-dimensional object cannot be detected (see S15 in FIG. 16).

Figure 8:
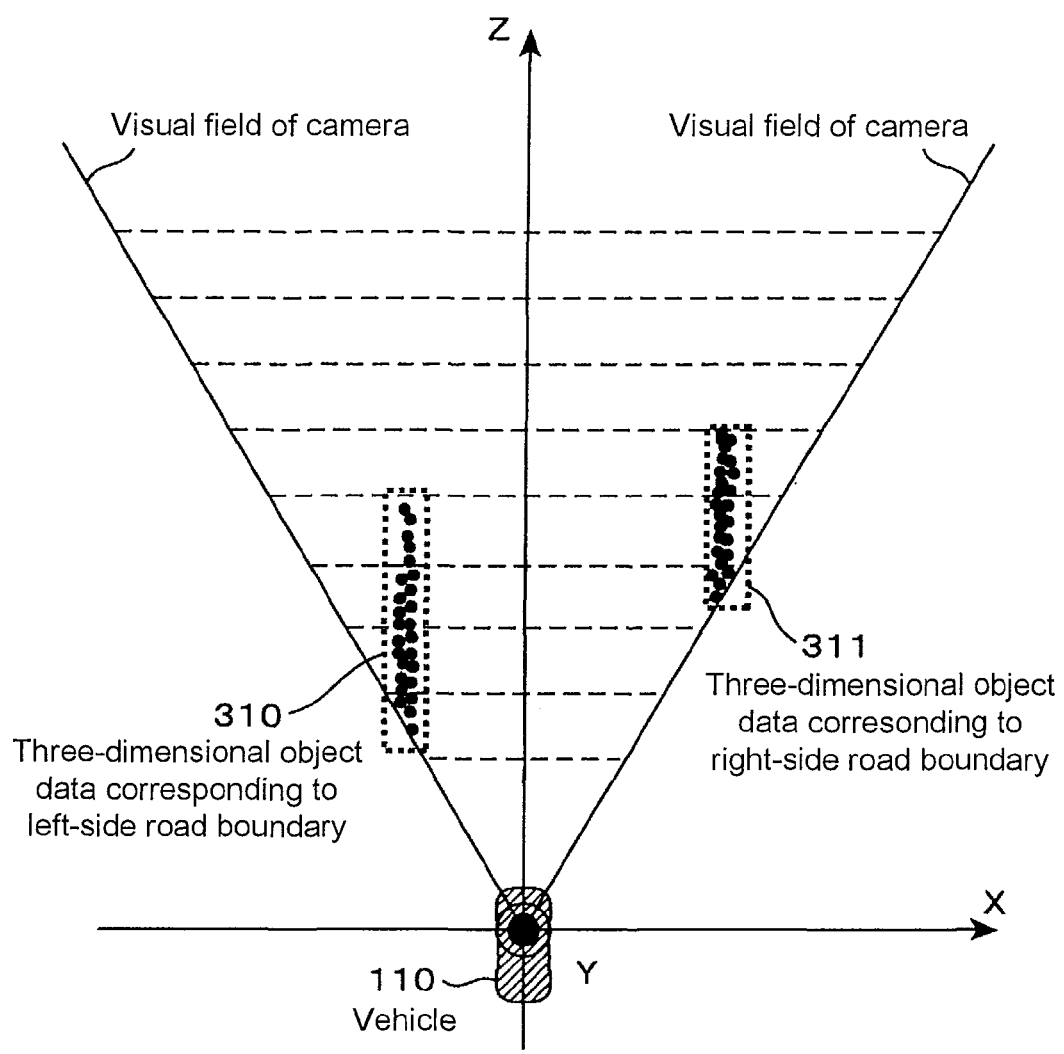
FIG. 8 shows a state of distribution of three-dimensional position/distance data of three-dimensional objects corresponding to road boundaries on the XZ plane.

FIG. 8 shows distribution of three-dimensional distance data of three-dimensional objects corresponding to road boundaries detected by the above process. On the left and right, distributions of three-dimensional data of three-dimensional objects corresponding to left and right road boundaries 310, 311 are recognized. FIG. 9 shows a distribution result for each strip corresponding to the detection result shown in FIG. 8. The heights and positions of three-dimensional objects corresponding to road boundaries obtained as described above for each strip and the data of the classification result are stored in the memory.

The same boundary judgment section 105 is a section for judging whether the same three-dimensional object in a first road area exists in a second road area by comparing images corresponding to the first road areas in the image obtained by the image acquisition section 102 and images corresponding to the second road areas in the image on the basis of the result of the classification by the road boundary detection section 104. Since this estimation process is performed for each acquired image, a road boundary can be estimated even when a three-dimensional object is hidden due to occlusion.

Next, the flow of the process by the same boundary judgment section will be described. First, a strip classified as a second road area is searched for from the result of the process by the road boundary detection section (see S18 in FIG. 17). If an appropriate strip is found, each of images obtained from the left and right cameras 100 and 101 is projection-transformed to an image in which a three-dimensional object in a first road area positioned before the appropriate strip (or included in a predetermined number of strips starting from the appropriate strip) is viewed from in front (see S19 in FIG. 17). By transforming the images, it is possible to solve the problem that images corresponding to the first and second road areas get smaller towards the vanishing point, which makes it difficult to compare them. Furthermore, by horizontalizing the positions of the images corresponding to the first and second road areas, the comparison can be facilitated. The transformation formula is shown below:

$$\lambda \begin{bmatrix} u' \\ v' \\ 1 \end{bmatrix} = \begin{bmatrix} h_{11} & h_{12} & h_{13} \\ h_{21} & h_{22} & h_{23} \\ h_{31} & h_{32} & h_{33} \end{bmatrix} \begin{bmatrix} u \\ v \\ 1 \end{bmatrix} \quad \text{(Formula 2)}$$

$$H = \begin{bmatrix} h_{11} & h_{12} & h_{13} \\ h_{21} & h_{22} & h_{23} \\ h_{31} & h_{32} & h_{33} \end{bmatrix} \quad \text{(Formula 3)}$$

Here, u and v denote the positions of images before transform; u' and v' denote the positions of the images after transform; and $\lambda$ denotes an eigenvalue. Elements of a projection-transform matrix H are denoted by variables $h_{11}$ to $h_{33}$.

Then, the projection-transform matrix H can be calculated by the following formula:

$$H = A[R't'][Rt]^T A^T (A[Rt][Rt]^T A^T)^{-1} \quad \text{(Formula 4)}$$

Here, a matrix A is a 3×3 internal parameter matrix constituted by the focal distance of a lens mounted on a camera, the image center and the pixel size. A matrix R and a vector t denote a 3×3 rotation matrix related to the attitude of the camera relative to the world coordinate system and the three-dimensional position of the camera. The matrix A, the matrix R and the vector t are prepared for each of the left and right cameras 100 and 101, and the values of them are known because they are determined by camera calibration performed before factory shipment. However, it is assumed that the latest values is used when the values are changed by camera calibration after the camera is mounted on a vehicle.

A matrix R' and a vector t' denote a rotation matrix and a three-dimensional position in the case where the attitude and three-dimensional position of the camera are virtually moved in a manner that the three-dimensional object in a first road area positioned before the appropriate strip (or included in the predetermined number of strips starting from the appropriate strip) described above is viewed from in front. The attitude of the virtual camera is set, for example, so that the optical axis of the camera points to a three-dimensional object existing in a strip immediately before a strip classified as a second road area. In the case of the example shown in FIG. 10, the direction of the virtual camera can be set in a manner that its optical axis is overlapped with or in parallel with a straight line 331 which is at right angles to a straight line 334 formed by data obtained by projecting the three-dimensional distance data of a three-dimensional object existing in the strip with a strip number W4 onto the XZ plane and which is in parallel with the road model of (Formula 1).

Figure 10:
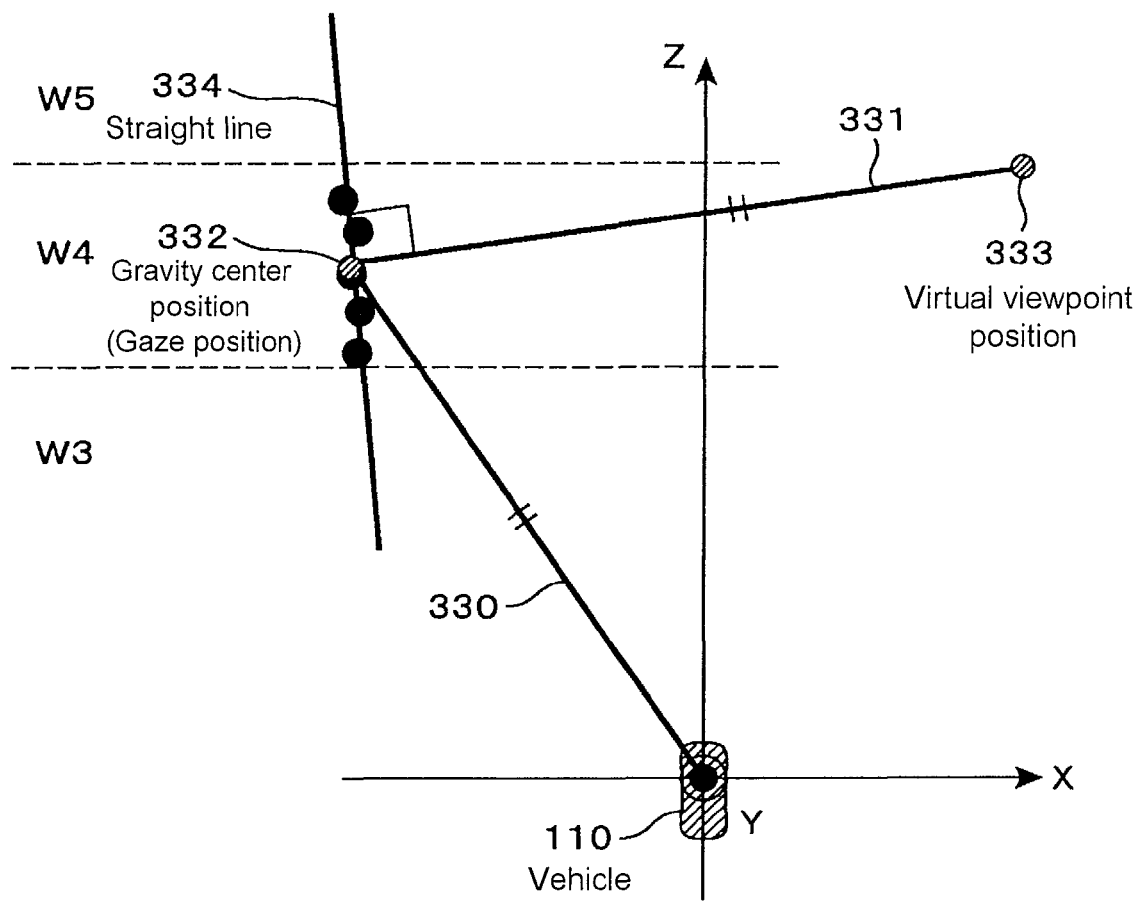
FIG. 10 shows the positions of the gravity centers of three-dimensional position data of a three-dimensional object and a virtual viewpoint on the XZ plane.

In the example shown in FIG. 10, the three-dimensional position of the virtual camera is set at such a position 333 that the set optical axis of the camera passes through a gaze position 332 and the distance from the gaze position 332 is equal to the distance from the camera of the vehicle to the gaze position when a gravity center position 332 of the three-dimensional distance data of the three-dimensional object existing in the strip with the strip number W4 is set as the gaze position. That is, the three-dimensional position of the camera can be set at the position 333 on the straight line 331 where the distance from the position 332 is equal to the length of the straight line 330.

In this way, the projection-transform matrix H can be calculated by (Formula 4). However, in the case where the number of the three-dimensional distance data of the three-dimensional object existing in the strip is smaller than a predetermined number, it is recommended to use the three-dimensional distance data of a three-dimensional object included in a strip immediately before the strip.

Figure 11:
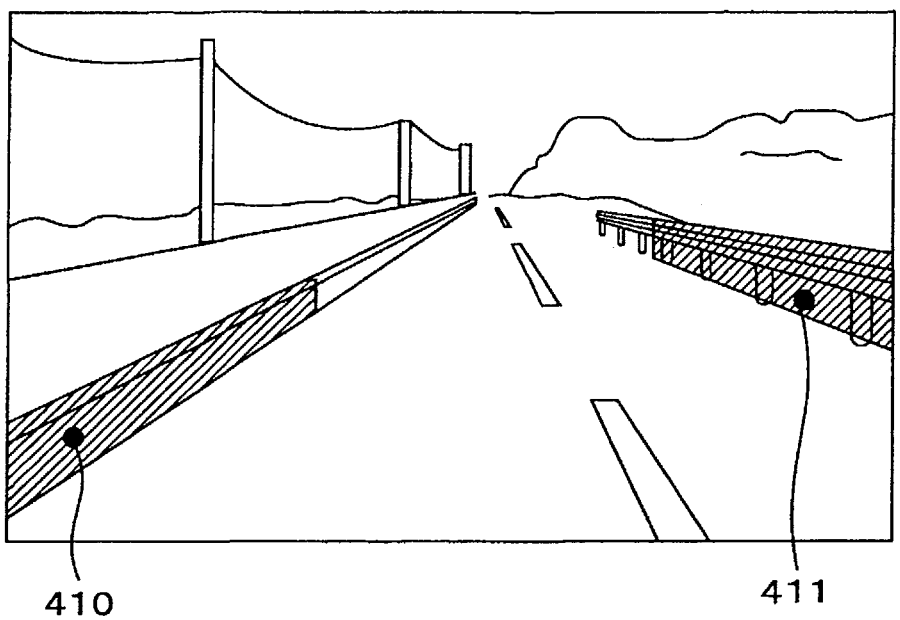
FIG. 11 shows an example of an image obtained from the right camera of the vehicle and detected three-dimensional objects corresponding to road boundaries.
Figure 12:
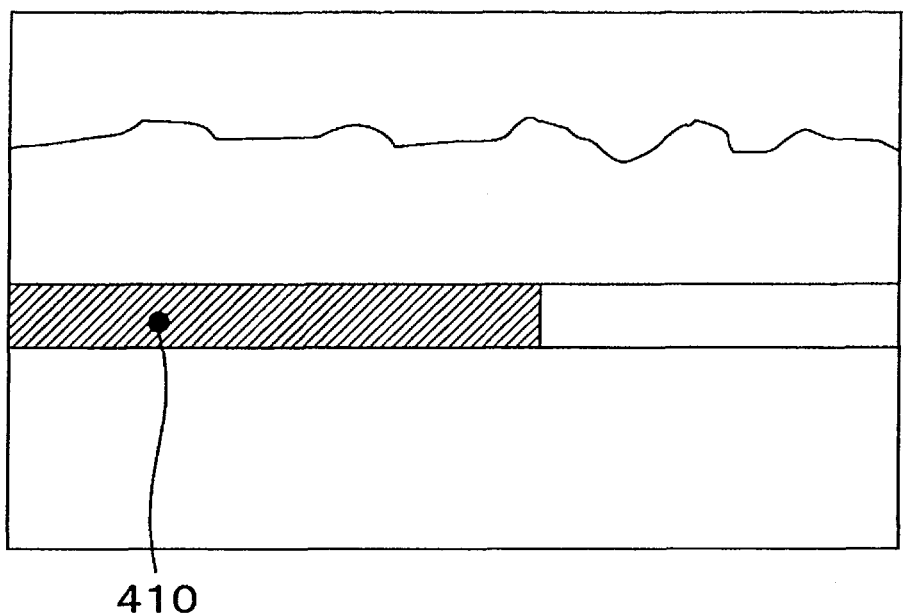
FIG. 12 shows an example of an image transformed in a manner that an area 410 of the three-dimensional object corresponding to the left-side road boundary in FIG. 11 is viewed from in front.

FIGS. 11 and 12 show an example of transforming an image by projection-transform. FIG. 11 shows an image acquired from the right camera 101, and three-dimensional objects corresponding to road boundaries detected by the road boundary detection section 104 are indicated by shaded parts 410 and 411 in the image shown in FIG. 11. FIG. 12 shows an image projection-transformed in a manner that, for the three-dimensional object corresponding to the area indicated by the shaded part 410 in FIG. 11, a three-dimensional object in the strip with the strip number W4 is viewed from in front. By performing the transform as described above, it is possible to suppress change in the image of a three-dimensional object getting smaller towards the vanishing point, and it is further possible to horizontalize the image positions in first and second road areas.

Figure 17:
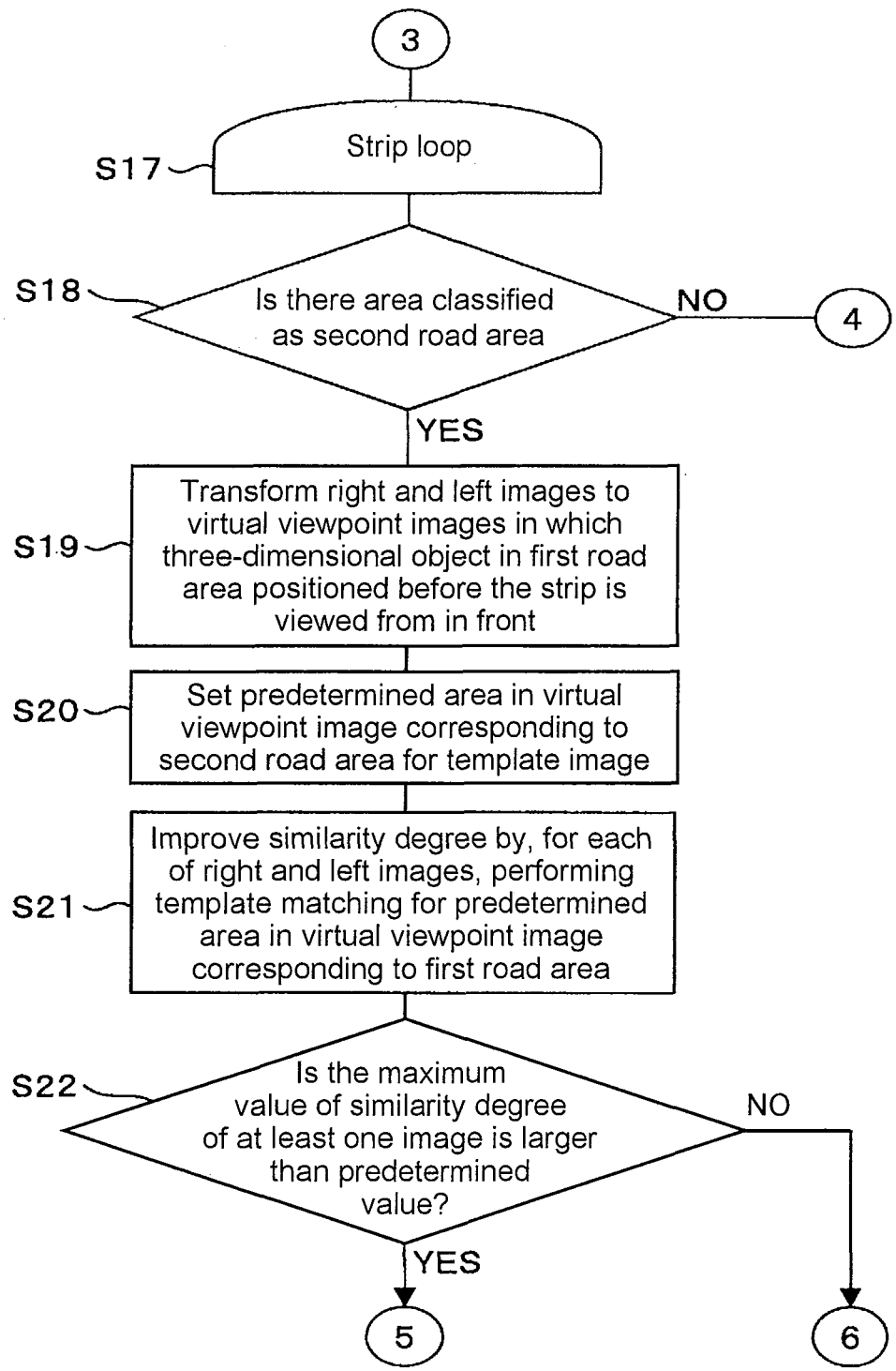
FIG. 17 shows a part of the operation flowchart of the first embodiment.

Next, in the projection-transformed image, a predetermined sized template is set at a predetermined position in an image area corresponding to a second road area where a three-dimensional object is not detected (see S20 in FIG. 17). It is recommended to, when the template size is set, make a square with the longitudinal length of a three-dimensional object existing in a strip (a first road area) which is immediately before a strip adjoining the second road area in the image as the length of one side. The template position can be set in a second road area which horizontally adjoins the first road area in this projection-transformed image.

The template set in this way is moved within an image area corresponding to the first road area, which is the search range, to calculate the similarity degree between the image in this template and the image area corresponding to the first road area (see S21 in FIG. 17).

Figure 18:
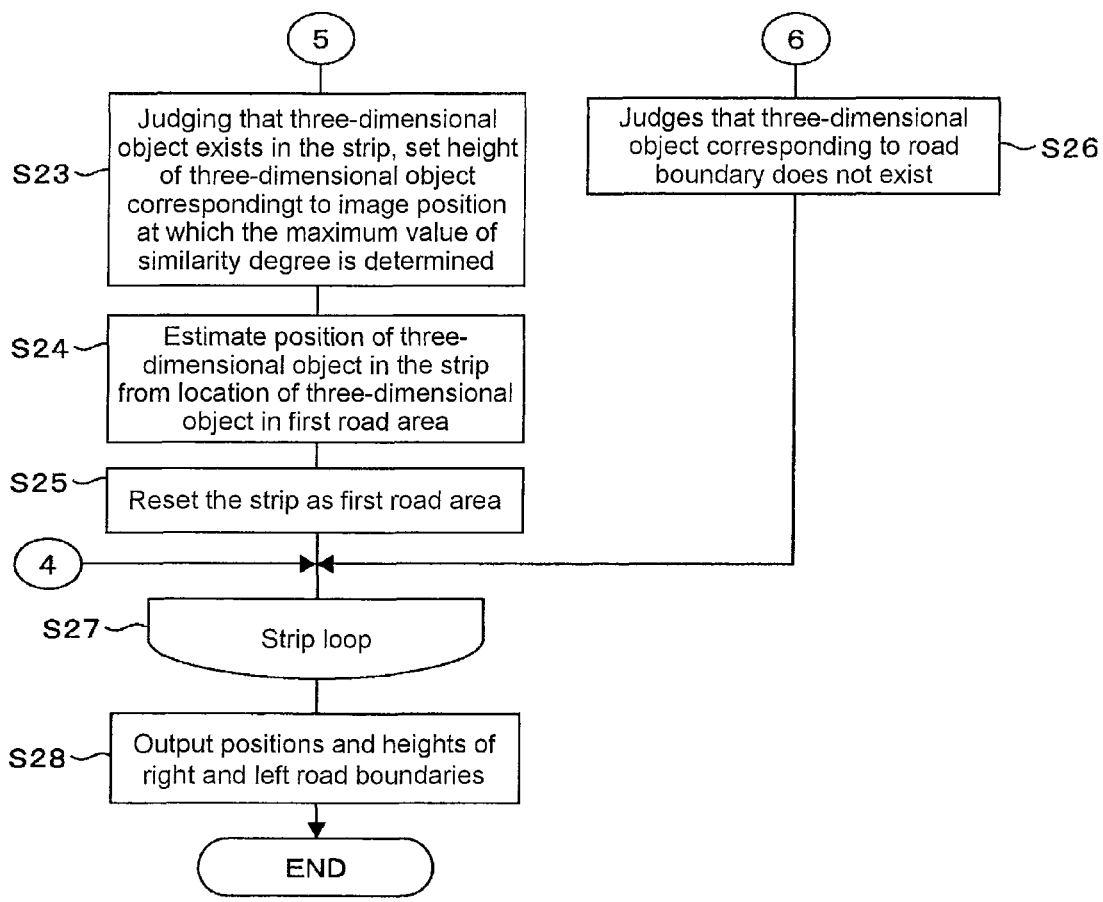
FIG. 18 shows a part of the operation flowchart of the first embodiment.

If the maximum value of this similarity degree is larger than a predetermined value, it is assumed that a three-dimensional object with the same height as a three-dimensional object existing in the first road area corresponding to a template position at which the similarity degree peaks exists at the image position at which the template is set (see S23 in FIG. 18). Furthermore, the template matching process is performed for each of images obtained from the left and right cameras 100 and 101. If the similarity of any one of the right and left exceeds the predetermined value, it is also determined that a three-dimensional object with the same height as a three-dimensional object existing in the first road area corresponding to a template position at which the similarity degree peaks exists, similarly to the above.

The above process is performed over the whole image area corresponding to a strip set as the second road area while gradually moving the template setting position. If the maximum value of the similarity degree exceeds the predetermined value at least once, the strip is reset from the second area to a first area (see S25 in FIG. 18).

The maximum value of the similarity degree is smaller than the predetermined value, it is judged that a three-dimensional object corresponding to a road area does not exist (see S26 in FIG. 18).

By executing the above process for all strips classified as second road areas, the position and height of a three-dimensional object corresponding to a road boundary, which could not be detected in the three-dimensional distance data, are estimated (see S28 in FIG. 18). It is recommended to use a correlation coefficient resistant to change in contrast or lightness as the similarity degree. In addition thereto, a scale for texture such as Fourier transform may be used.

Figure 13:
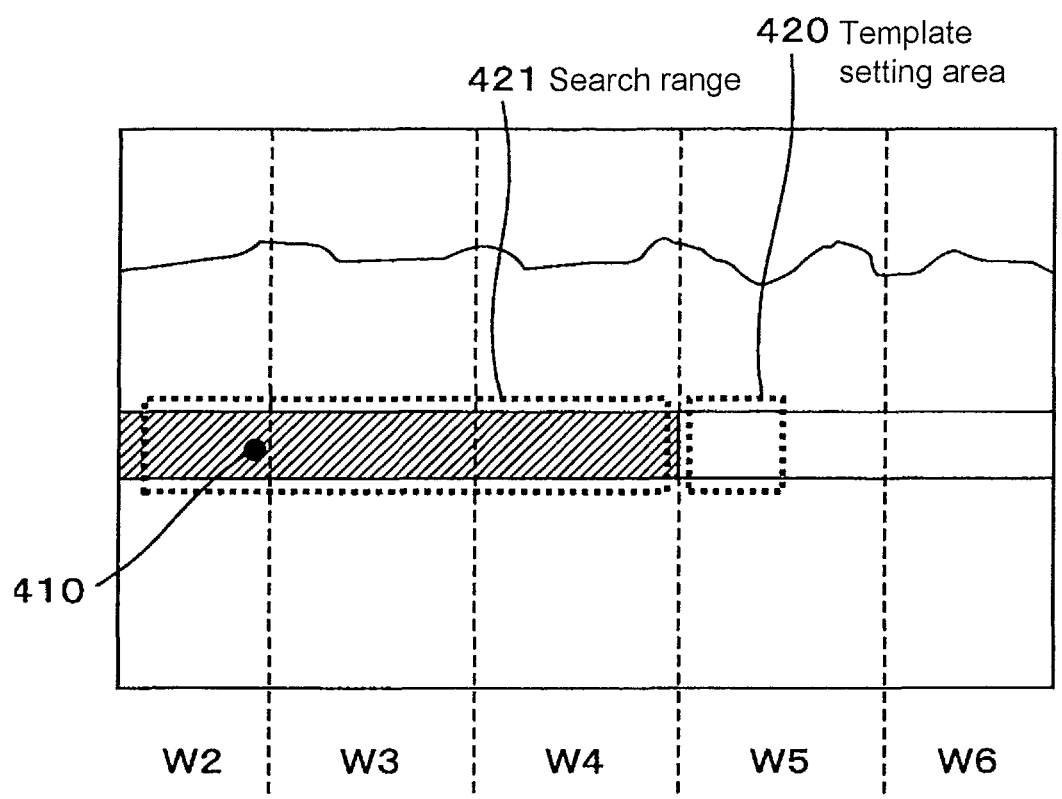
FIG. 13 shows a template setting area and a template matching search range.

FIG. 13 shows a template setting area 420 and a search range 421 in an example of setting a template. A template is set in an image area with a strip number W5 classified as a second road area. Template matching is performed for the search range 421 to judge whether or not the maximum value of the similarity degree exceeds a predetermined value. When this judgment ends, the template setting area is moved to the right side in FIG. 13, and template matching for the search range 421 is performed again. When the template setting area is moved to the right side, a predetermined range may be overlapped with the previous setting area.

Figure 14:
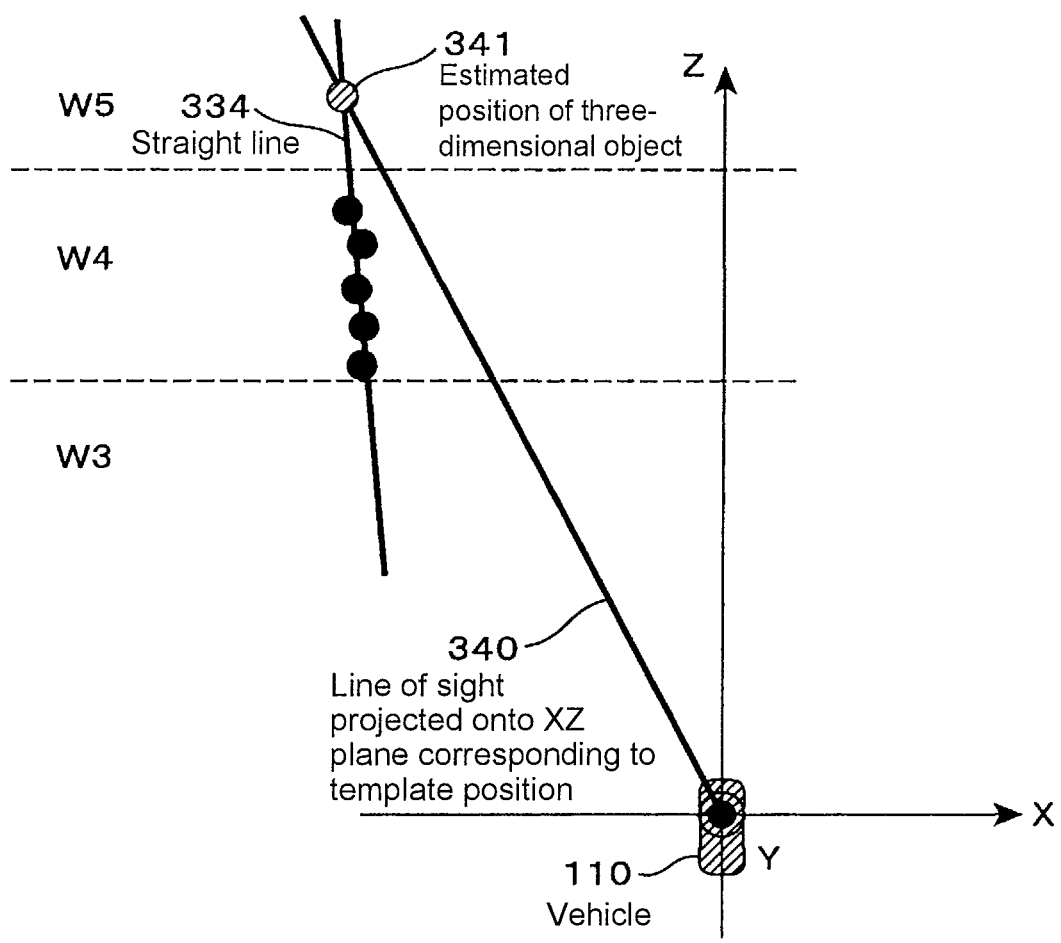
FIG. 14 is shows method for determining an estimated position (X, Z) of the three-dimensional object.
Figure 15:
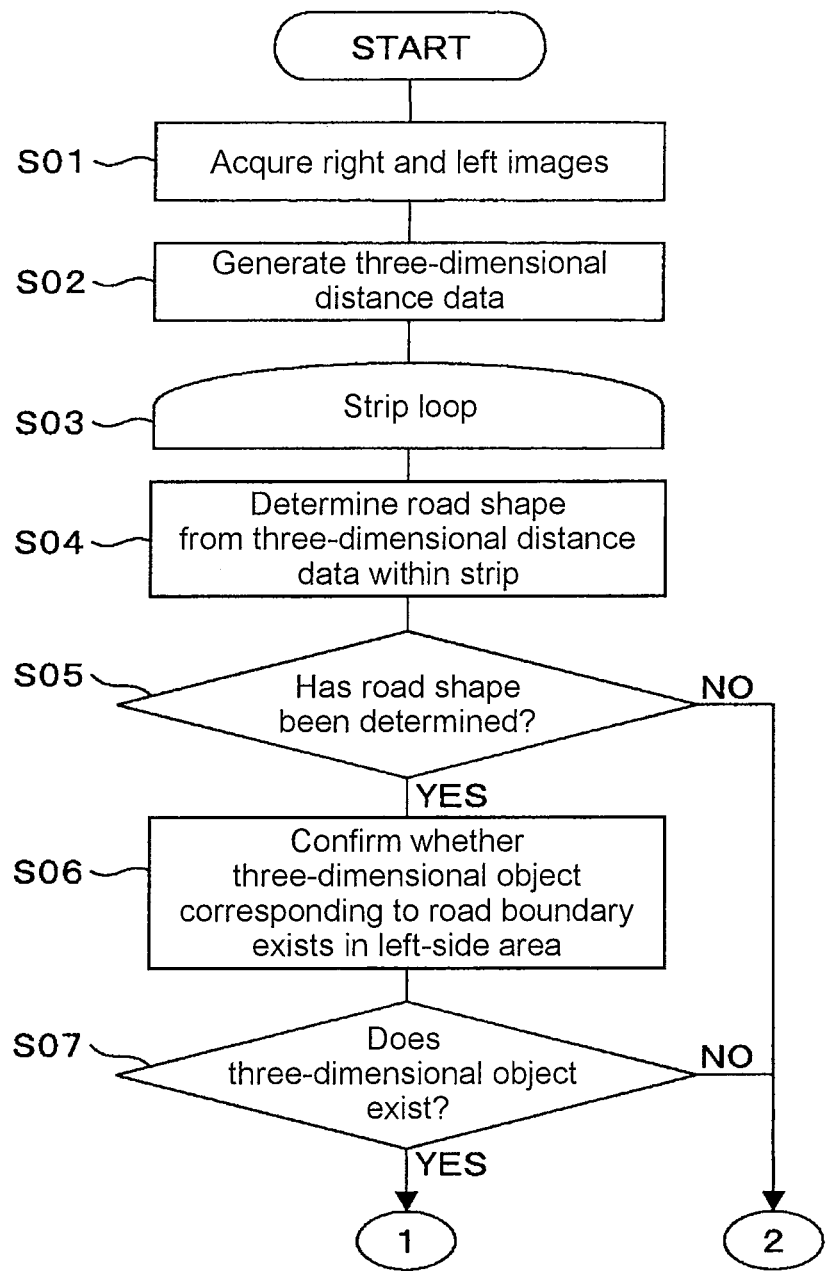
FIG. 15 shows a part of an operation flowchart of the first embodiment.

To estimate a position (X, Z) of a three-dimensional object on the XZ plane in the above process, it is recommended, for example, that the coordinates of an intersection point 341 at which the straight line 334 on the XZ plane calculated when the projection-transform matrix was determined and a straight line 340 obtained by projecting a line of sight corresponding to the template position onto the XZ plane cross with each other is determined as the position (X, Z) as shown in FIG. 14. However, it is also possible to project not only the three-dimensional distance data in the strip with the strip number W4 but also three-dimensional distance data of another strip corresponding to a first road area onto the XZ plane, and set the coordinates of an intersection of an equation of higher degree applied to this projected data with the straight line 340, as the position (X, Z).

As described above, the height and position of a three-dimensional object corresponding to road boundary existing in the travel direction of the vehicle can be detected by the road boundary detection section 104 and the same boundary judgment section 105. The first embodiment is an embodiment using two right and left cameras. However, in the case where there are more than two cameras, it is possible to extend and apply the first embodiment by combining two cameras among them.

Second Embodiment

Figure 19:
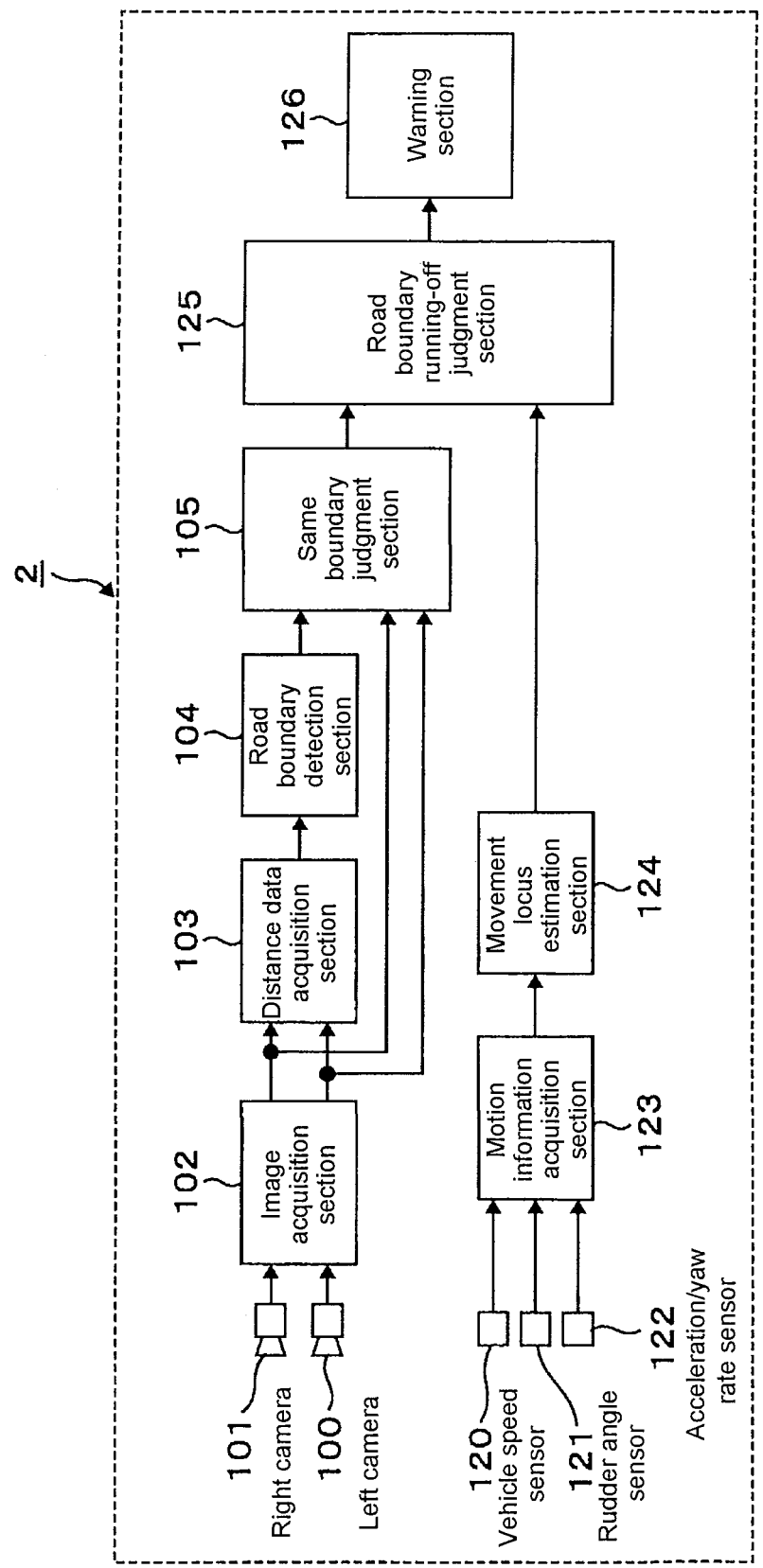
FIG. 19 shows a part of an operation flowchart of a second embodiment.

Next, a road boundary detection/judgment device of a second embodiment will be described. FIG. 19 is a block diagram showing the configuration of a road boundary detection/judgment device of the second embodiment. The configuration of the second embodiment is the configuration the road boundary detection/judgment device of the first embodiment added with a motion information acquisition section 123 for acquiring motion information about the vehicle 110, a movement locus estimation section 124 for estimating a movement locus, a road boundary running-off judgment section 125 for detecting running-off of the vehicle 110 from a road, and a warning section for giving a driver a warning. The details of each section will be described below.

The motion information acquisition section 123 is a section for acquiring signals from a vehicle speed sensor 120, a rudder angle sensor 121, an acceleration/yaw rate sensor 122 which are mounted on the vehicle 110, and transmits and receives signals at predetermined time intervals in accordance with a communication protocol such as CAN (Control Area Network) and FlexRay. However, the present invention is not limited to the above communication protocols, and other communication protocols may be used.

The movement locus estimation section 124 is a section for estimating the movement locus of the vehicle until after a predetermined time, on the basis of the speed, rudder angle, and acceleration/yaw rate of the vehicle acquired by the motion information acquisition section 123. A vehicle motion model based on the vehicle dynamics of the vehicle is used to estimate the movement locus. It is necessary to perform numerical integration until predetermined time to estimate a movement locus using a vehicle motion model. However, there is a possibility that measurement errors included in signals of the various sensors accumulate and increase in the number of estimation errors is caused.

To cope with this, it is possible to reduce the number of estimation errors, for example, by adding position information obtained from a GPS (Global Positioning System). Position information about an estimated movement locus is assumed to be points on the XZ plane in the world coordinate system constituted by the X axis 200, the Y axis 201 and the Z axis 202 shown in FIG. 2. It is also possible to project a movement locus to a road model estimated by the road boundary detection section 104. The present invention is not limited to the movement locus estimation method, and other estimation methods may be used.

The position information about the movement locus estimated by the movement locus estimation section 124 is stored into the memory. Position information about one movement locus may be stored in the memory for each strip, or position information for each predetermined time period may be stored.

Figure 20:
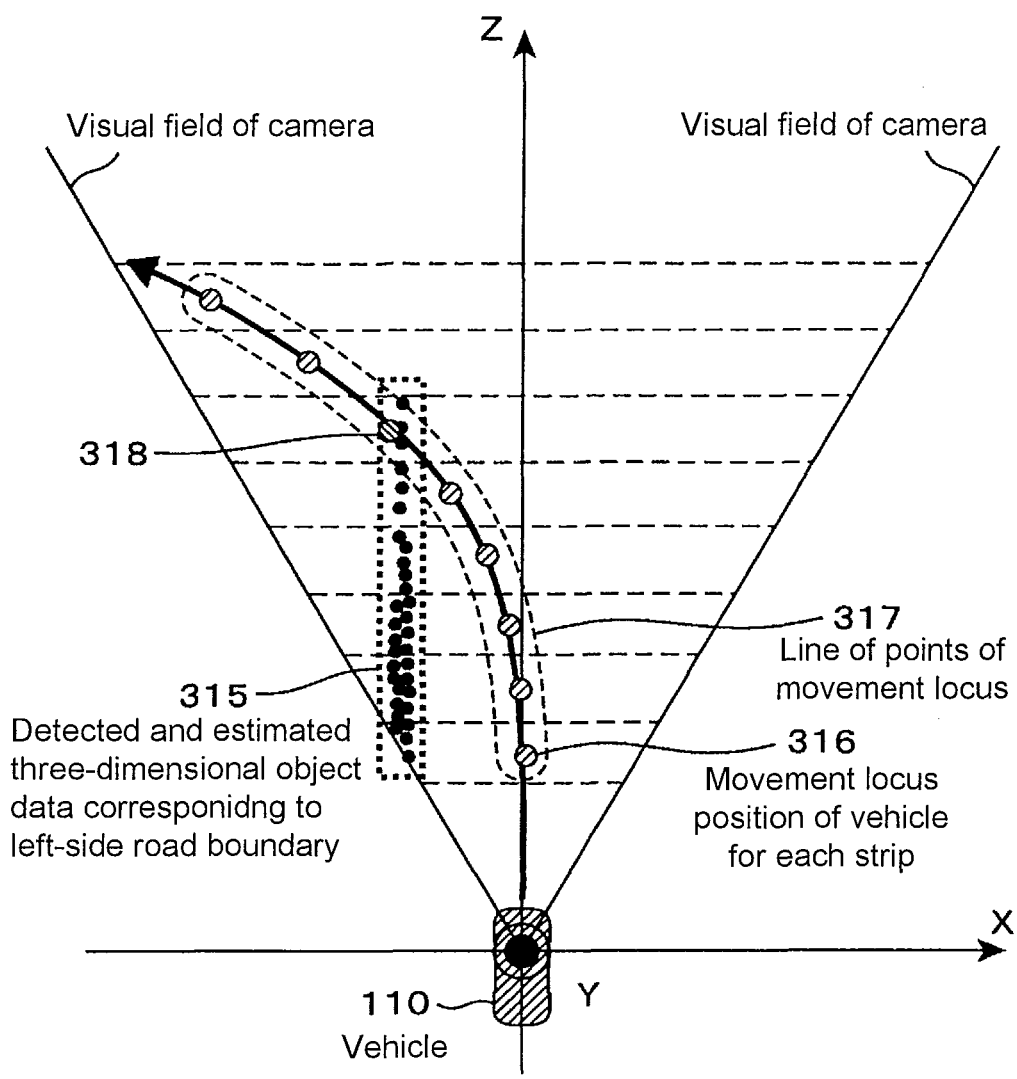
FIG. 20 shows a scene in which a vehicle runs off a road boundary.

The road boundary running-off judgment section 125 is a section for judging whether or not the vehicle runs off a road boundary, on the basis of position information about a movement locus estimated by the movement locus estimation section 124 and position information about a three-dimensional objects corresponding to right and left road boundaries obtained by the road boundary detection section 104 and the same boundary judgment section 105. FIG. 20 shows an example of performing running-off judgment. The figure shows that a movement locus 316 estimated by the movement locus estimation section 124 crosses over the position of a three-dimensional object 315 corresponding to a left-side road boundary detected and estimated by the road boundary detection section 104 and the same boundary judgment section 105.

The contents of the judgment process will be described below with reference to FIG. 20. Firstly, estimates put position 318 of a locus movement crossing over three-dimensional objects of right and left road boundaries. Then, crossing time tc required for crossing over the boundary is calculated using a travel distance L to the crossing position 318 and a vehicle speed v, from the following formula:

$$tc = \frac{L}{v} \quad \text{(Formula 5)}$$

Furthermore, the number of continuous estimations Nc of the crossing position 318 is counted. The number of continuous estimations Nc is set for the purpose of reducing misjudgment of crossing due to oscillation of a movement locus caused by a minute vibration of a rudder angle caused by operation of a handle by a driver and noise included in output signals of the vehicle speed sensor 120 and the acceleration/yaw rate sensor 122.

If the crossing time tc is shorter than a predetermined value, and the number of continuous estimations Nc is larger than a predetermined value, it is judged that the possibility of the vehicle running off the road is high. It is desirable to set the predetermined value for the crossing time tc on the basis of time required to stop before the crossing position at a predetermined deceleration and statistics of time required for a driver to perform a series of operations of recognizing/judging an obstacle and performing an avoidance or control operation. Thus, it is judged by the road boundary running-off judgment section whether or not to give a warning for prevention of running-off.

A warning section 126 is a section for giving the driver a warning on the basis of a result of the judgment by the road boundary running-off judgment section 125. As the warning, it is desirable to give a warning sound via a speaker mounted on the vehicle or light a warning lamp. It is also possible to vibrate the handle. The present invention is not limited to the ways of giving a warning described above. Other methods may be used.

As described above, the second embodiment makes it possible to prevent a vehicle from running off a road by giving a driver a road running-off warning.

| Reference Signs List | |
| --- | --- |
| 100 | left camera |
| 101 | right camera |
| 102 | image acquisition section |
| 103 | distance data acquisition section |
| 104 | road boundary detection section |
| 105 | same boundary judgment section |
| 110 | vehicle |
| 120 | vehicle speed sensor |
| 121 | rudder angle sensor |

-continued

Reference Signs List

| | |
|---|---|
| 122 | acceleration/yaw rate sensor |
| 123 | motion information acquisition section |
| 124 | movement locus estimation section |
| 125 | road boundary running-off judgment section |
| 126 | warning section |
| 200 | X axis |
| 201 | Y axis |
| 202 | Z axis |
| 300 | three-dimensional distance data |
| 301 | strip |
| 305 | three-dimensional distance data included in strip 301 |
| 310 | three-dimensional object data corresponding to left-side road boundary |
| 311 | three-dimensional object data corresonding to right-side road boundary |
| 315 | detected and estimated three-dimensional object data corresponding to left-side road boundary |
| 316 | movement locus position of vehicle for each strip |
| 317 | line of points of movement locus |
| 320 | curb |
| 330 | distance to gase position |
| 331 | distance between virtual viewpoint position and gase position |
| 332 | gaze position |
| 333 | virtual viewpoint position |
| 334 | result of applying XZ projection points of three-dimensional distance data included in strip W4 to straight line |
| 340 | line of sight projected onto XZ plane corresponding to template position at which similarity degree peaks |
| 341 | estimated position of three-dimensional object |
| 400 | road shape |
| 401 | three-dimensional object corresponding to road boundary |
| 402 | Y' axis |
| 403 | X' axis |
| 410 | three-dimensional object data corresponding to left-side road boundary on right screen |
| 411 | three-dimensional object data corresponding to left-side road boundary on left screen |
| 420 | template setting area |
| 421 | search range |

The invention claimed is:

1. An in-vehicle device detecting and judging a three-dimensional object on a boundary of a road on which a vehicle runs, the device comprising:
an image acquisition section having two or more cameras for image-capturing the road area;
a distance data acquisition section acquiring three-dimensional distance information about an image-capture area on the basis of an image obtained by the image acquisition section;
a road boundary detection section detecting the height of a three-dimensional object existing in the road area on the basis of the three-dimensional distance information obtained by the distance data acquisition section to detect a road boundary; and
a same boundary judgment section transforming the image, for a first road area where the height of a three-dimensional object corresponding to a road boundary could be detected by the road boundary detection section and a second road area where the height of a three-dimensional object corresponding to a road boundary could not be detected by the road boundary detection section, and judging whether the three-dimensional object corresponding to the first road area and the three-dimensional object corresponding to the second road area are the same; wherein
if the same boundary judgment section judges that the three-dimensional objects corresponding to the first and second road area boundaries are the same, the second road area is reset as the first road area.

2. The road boundary detection/judgment device according to claim 1, wherein
the road boundary detection section detects a road shape at each of predetermined intervals forward from the vehicle on the basis of the three-dimensional distance information, judges whether a three-dimensional object with a height higher than a predetermined value exists in a predetermined area within the predetermined interval, for the detected road shape, calculates the three-dimensional position and height of the three-dimensional object and classifies the predetermined area as the first road area if it is judged that the three-dimensional object exists, and classifies the predetermined area as the second road area if it is judged that the three-dimensional object does not exist.

3. The road boundary detection/judgment device according to claim 2, wherein
on the basis of three-dimensional distance information about a three-dimensional object corresponding to the area boundary classified as the first road area before the predetermined area which has been detected by the road boundary detection section and classified as the second road area, and the road shape, the same boundary judgment section transforms the image to an image in which the three-dimensional object is virtually viewed from in front by projection-transform.

4. The road boundary detection/judgment device according to claim 3, wherein
the same boundary judgment section sets a predetermined area in the image in the area classified as the second road area, which is in contact with the a distant-side image position of the area classified as the first road area, as a template, calculates similarity degree between the template and the image within a predetermined area which includes a three-dimensional object corresponding to the boundary of the area classified as the first road area, and judges that a three-dimensional object corresponding to a template position at which the similarity degree peaks exists in the area classified as the second road area if the maximum value of the similarity degree is higher than a predetermined value.

5. The road boundary detection/judgment device according to claim 4, wherein
a correlation coefficient is used as the similarity degree.

6. The road boundary detection/judgment device according to claim 1, comprising:
a motion information acquisition section acquiring motion information about the vehicle;
a movement locus estimation section estimating a movement locus of the vehicle until after a predetermined time, on the basis of the motion information obtained by the motion information acquisition section; and
a warning section searching for a position at which the estimated movement locus and the three-dimensional object corresponding to a road boundary detected by the road boundary detection section and the same boundary judgment section cross with each other, and, if the crossing position exists, giving a driver a warning on the basis of the distance to the crossing position and the speed of the vehicle.

* * * * *